United States Patent [19]
Harris et al.

[11] 3,883,114
[45] May 13, 1975

[54] VALVE BODY

[75] Inventors: Bernard Harris, Bayside; Russell P. Johnson; Gerald G. Lambert, both of Milwaukee, all of Wis.

[73] Assignee: Rexnord, Inc., Milwaukee, Wis.

[22] Filed: Mar. 26, 1973

[21] Appl. No.: 345,019

[52] U.S. Cl. ............. 251/366; 264/135; 264/269; 425/DIG. 12; 249/DIG. 1
[51] Int. Cl.² .......................... F16K 11/07
[58] Field of Search.................. 251/366, 368, 324; 137/375, 625.66; 425/DIG. 12, 117, 127; 249/61, 62; 260/37 EP; 264/135, 265, 267, 269

[56] References Cited
UNITED STATES PATENTS

| | | | |
|---|---|---|---|
| 2,988,321 | 6/1961 | Gilmont | 251/368 X |
| 3,185,437 | 5/1965 | Rice | 251/368 X |
| 3,188,048 | 6/1965 | Sutherland | 251/368 X |
| 3,206,530 | 9/1965 | Boteler | 251/368 X |
| 3,211,164 | 1/1965 | Bender et al. | 251/363 X |
| 3,336,257 | 8/1967 | Alvey | 260/37 EP X |
| 3,362,922 | 1/1968 | Manasia et al. | 260/37 EP X |
| 3,366,603 | 1/1968 | Klaus et al. | 260/37 EP X |
| 3,395,890 | 8/1968 | Eckert et al. | 251/368 X |
| 3,446,236 | 5/1969 | Waltien | 251/368 X |
| 3,514,312 | 5/1970 | Gardiner | 264/134 X |
| 3,587,156 | 6/1971 | Sorenson | 137/625.66 X |
| 3,603,341 | 9/1971 | Scaramucci | 137/375 |
| 3,680,593 | 8/1972 | Sorenson | 251/324 X |
| 3,751,005 | 8/1973 | Earley | 251/368 |

OTHER PUBLICATIONS
Handbook of Epoxy Resins, Pages 14-10, 11 and 21 to 25, TP 1180. E6 L4CB.

*Primary Examiner*—Henry T. Klinksiek
*Attorney, Agent, or Firm*—Sughrue, Rothwell, Mion, Zinn & Macpeak

[57] ABSTRACT

A spool valve requiring a precisely cylindrical bore is cast about a wax core internally supported by a machined solid steel rod. Where desirable, the rod may be centered in a lathe and the wax portions of the core forming the bore are turned to the bore diameter. The casting is a powdered-metal filled resin spoxy resin which is formulated so that the exothermic curing reaction is controlled and does not affect the wax. The casting may be contained in a metal case which forms part or all of the mold. The mold is provided with a relatively soft elastomeric lining.

12 Claims, 8 Drawing Figures

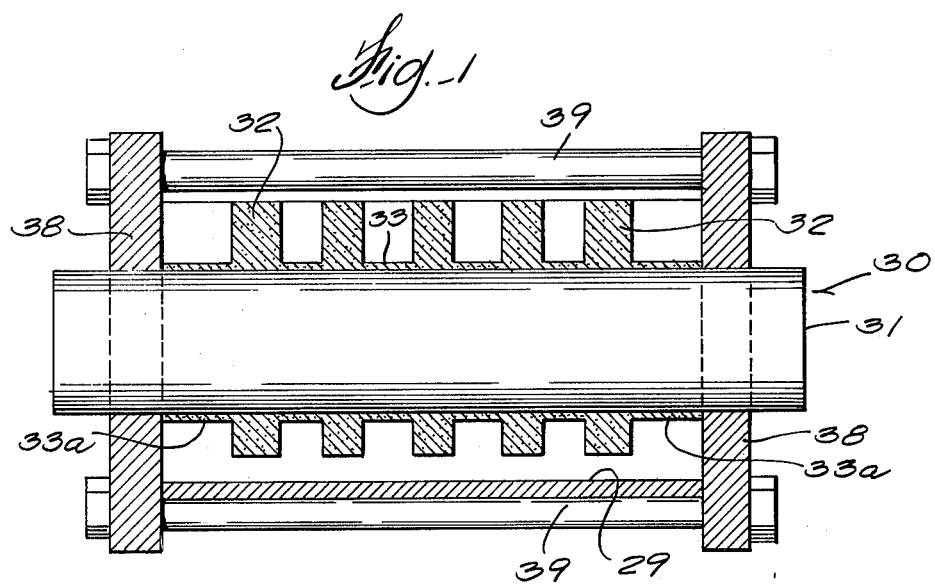
Fig. 1
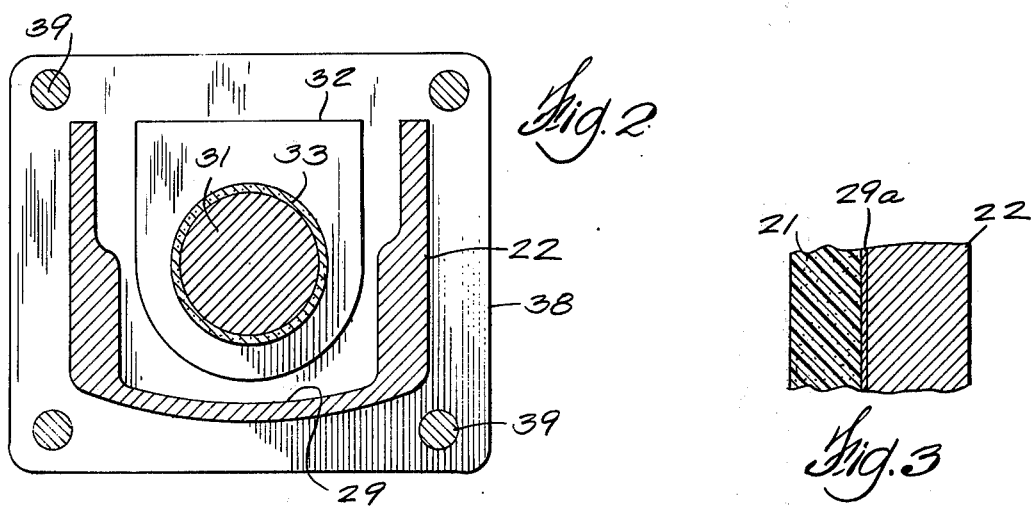
Fig. 2
Fig. 3
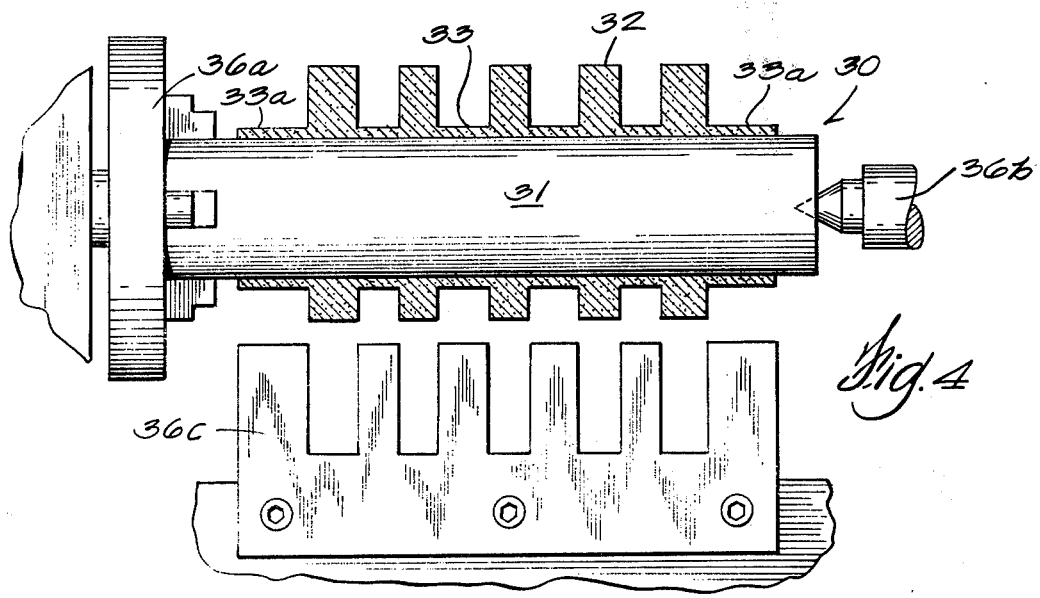
Fig. 4

VALVE BODY

BACKGROUND OF THE INVENTION

1. Field of the Invention

Metal particle-filled epoxy casting forming a valve body within a rigid metal shell.

2. Prior art

The method of casting intricate shapes with the lost wax process is itself one of the oldest arts. However, in adapting metal filled epoxy resins to this old art, the solutions of some problems which are encountered require other than the usual skill of the art.

U.S. Pat. No. 3,017,901 shows a valve with an intricate valve body comprising a multiplicity of parts. It is an object of the present invention to make such a valve body of single casting requiring no subsequent machining and at most only nominal dimensional corrections of the bore by honing where required.

SUMMARY OF THE INVENTION

The present invention provides for casting a valve body with a wax core which is supported on a metal rod and with the metal of the mold allows the exothermic reaction of the setting resin to proceed without affecting the dimensions of the mold so that a near-perfect cylindrical bore is provided after the wax is removed with mild heat and the rod is withdrawn. The interior of the shell is first painted with an elastomeric material to form a relatively soft film between the uncured resin and the shell. During curing of the resin the elastomer hardens to secure the hardened resin in the shell and provide a fluid seal around the valve passages.

BRIEF DESCRIPTION OF THE SEVERAL VIEWS OF THE DRAWING:

FIG. 1 is a vertical section taken on the centerline of the rod supporting the wax core in the mold. The mold comprises the shell of the finished article and two flat end pieces joined by rods under tension.

FIG. 2 is a central vertical longitudinal cross section of the assembly shown in FIG. 1.

FIG. 3 is an enlarged section of a small portion of the shell and cast material.

FIG. 4 is a plan view showing in part the method of turning the core for the mold, where desired.

Figure 5:
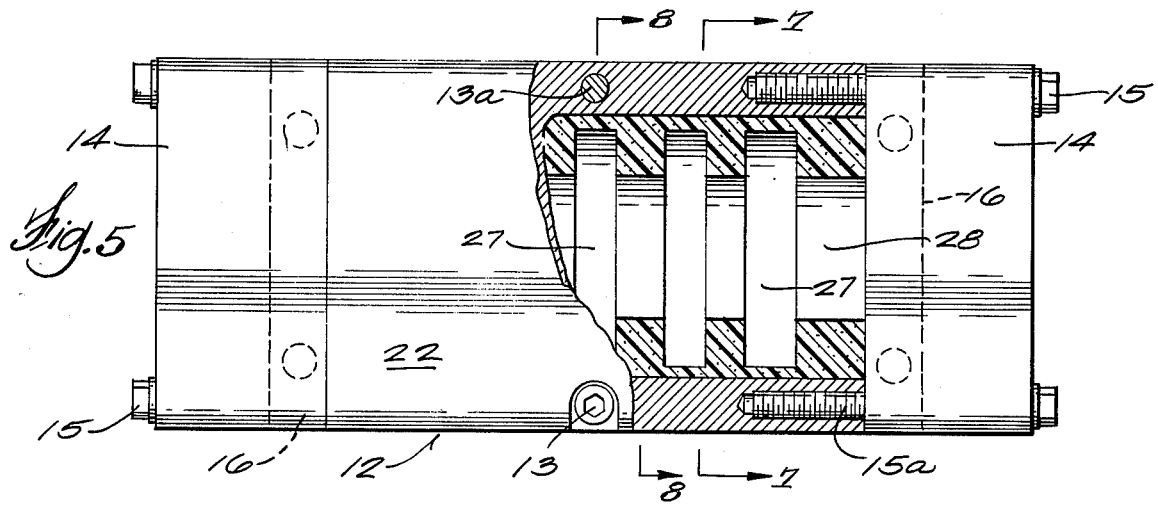
FIG. 5 is a plan view of the valve including a solenoid spool operator attached to each end of the valve body. Part of the valve body is broken away and sectioned in a plane at the centerline of the aligned bores for the spool, not shown.
Figure 6:
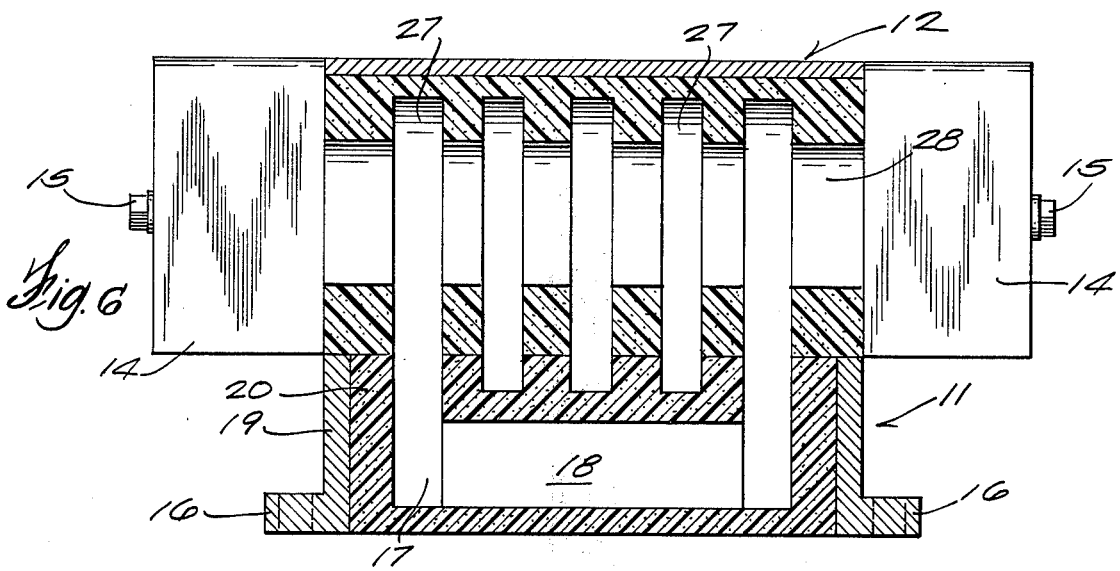
FIG. 6 is a side elevation of the valve. The base and the valve body are sectioned in a vertical plane at the centerline of the bore for the spool.
Figure 7:
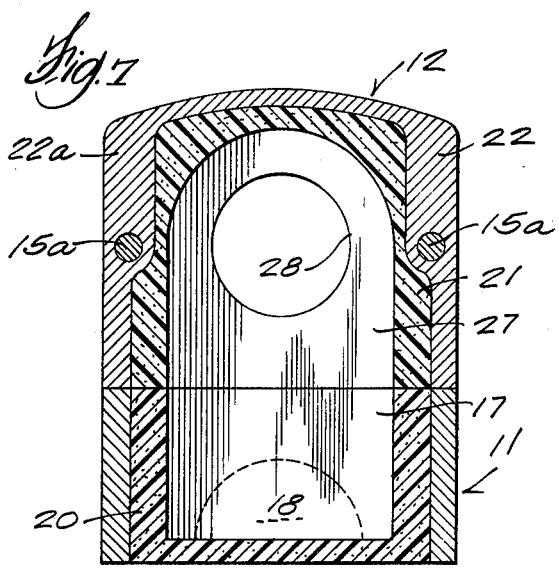
FIG. 7 is a section taken on line 7—7 of FIG. 5.
Figure 8:
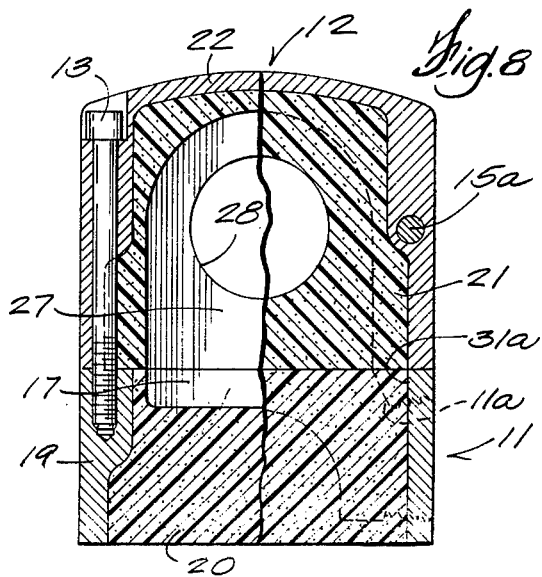
FIG. 8 is a section taken on line 8—8 of FIG. 5.

DESCRIPTION OF THE PREFERRED EMBODIMENT:

The valve shown in part in FIGS. 5–8 includes the base 11, the valve body 12 removably secured by the bolts 13 to base 11 and the solenoid operator units 14 removably secured by the bolts 15 to the ends of valve body 12. The ends of base 11 are provided with the flanges 16 by which the base is secured to the machine or other structural member which is to support the valve. The sides of base 11 are provided with threaded ports including port 11a by which the several fluid supply lines, not shown, are connected to the base. The several ports communicate with particular chambers 17 having rectangular openings in the flat upper surface of base 11. The two end openings are joined by the passage 18 so that they both communicate with a single port; port 11a as shown communicates with one of the intermediate openings 11b.

Base 11 comprises a die-cast aluminum outer shell 19 and an interior resin cast material 20 which is similar to that of the valve body, as will be described.

The valve body 12 comprises the interior casting 21 and the outer aluminum casing or shell 22. The shell may be a die-casting which should include the two sides and the top of the valve body. The shell 22 as shown is of uniform cross-section such that it may readily be formed as a continuous extrusion which is cut to the required length. Preferably, for that purpose, each side has a thicker upper portion 22a adjoining the top which allows for the threaded holes 15a for bolts 15 and the holes 13a for the bolts 13. The flat ends and bottom of casting 21 are flush with the cut ends and bottom edges of shell 22 and are so formed as will be described.

The interior of casting 21 includes a series of fluid passages 27 which are disposed intermediate to the bores 28 and open at the bottom of the casting. The aligned cylindrical bores 28 may also be referred to as a single bore extending the length of casting 21. The lower ends of chambers 27 register with the openings of chamber 17 of base 11 and the bore 28 is of the precise diameter necessary for the spool, not shown, which completes the valve.

The shell 22 may be of aluminum and treated with a chromate dip such as Alodine (TM) which provides a paint-adherent type surface. Holes 13a and 15a are then machined and the interior of the shell 22 is then coated on the inside only with a Shore A-30 elastomeric, air-hardening or air-drying material 29 (shown in FIGS. 1 and 2) such as urethane with a curing agent which allows the elastomer to be applied, for example, with a paint brush. The painting and partial drying or curing should provide a soft, tacky film having a thickness in the order of 0.020 inches.

A core 30 (shown in FIGS. 1, 2, and 4) must be made for each valve body 12 to be made and for that purpose a reuseable aluminum mold, not shown, is prepared having an interior chamber which corresponds with that of the finished valve body except that the bore diameter is a few hundredths of an inch larger than that of the valve body. Core 30 comprises the round stainless steel rod 31 and a wax formation which is cast on the rod. Rod 31 is of a diameter which is only a few hundredths of an inch less than the diameter of the finished bore 28 and of a length somewhat longer than the casting 21 and the shell 20. The ends of the rod 31 have suitable turning centers.

The wax formation includes spaced blocks 32 which form the chambers 27, and the sleeves 33 which surround the rod and join blocks 32. The distance between the remote ends of sleeves 33a which extend toward the ends of the rod should equal the length of the corresponding portions of the shell 22 and casting 21.

An optional step in preparing core 30 is shown in FIG. 4 where, as shown, the rod 31 is placed in a lathe including the headstock 36a, the tailstock 36b and the profile cutter 36c. Only some wax is removed from between the blocks 32 so that the wax sleeves 33 and 33a are precisely dimensioned and are of only a nominal thickness.

Upon completion of core 30, each end of rod 31 is assembled in the central hole of an end plate 38 and the shell 22 with coating 29 is placed endwise between the plates. The four tension rods 39 serve to clamp shell 22 between the plates and completes the mold. Both the shell 22 and the core 30 are inverted so that the flat upper ends of the wax blocks 32 and the two edges of shell 22 are in a horizontal plane and form the mold for the casting 21.

The material of casting 21 must be carefully formulated with respect to the heat-dissipation characteristics of the mold and with special consideration for the wax of core 30. The mold as shown in the drawings is approximately one-half the size of the mold which has been used with the material to be described.

An aluminum powder is mixed with the resin liquid in any suitable quantity. The powder is commercially available in atomized form consisting of round particles of approximately 100 mesh. The ratio of aluminum and resin is about 67 and 33% by weight and about 22 and 78% by volume.

The hardener may be mixed with an accelerator also in any suitable quantity except for expected or unexpected changes in conditions. The resin without hardener typically has a curing time of 72 hours at room temperature and the accelerator may be used to reduce the curing time to as little as 18 hours. While the reduced number of molds required with reduced curing time is the object, at the same time the conditions required for uniform results must be more nearly consistent as the curing time is reduced.

The mixing of the resin with metal powder and the hardener with accelerator must be accomplished with no exposure to air and should carried out generally as the casting process proceeds because the casting mixture has a pot life of only up to 60 minutes. The pouring into the mold must be carried out in a vacuum chamber (2mm. mercury, max.) to eliminate any and all air and bubbles in the casting. The mold is shown in FIGS. 1 and 2 and includes also the elastomer coating 29. The pouring must be accomplished while the coating is still reasonably soft and tacky.

After pouring, the mold may be removed from the chamber and allowed to stand steady at ordinary room temperature for curing. After 18 hours the end plates 38 may be removed; after 120 hours (5 days) the wax may be removed by heating the casting at 150°F. for three hours and the metal rod 31 is then also removed; accelerated post-curing by heating at 250°F. for three hours is allowed dependent only in that the elastomer coating 29 must not be affected. During the curing of the epoxy resin, the coating 29 also cures or dries to form the liner 29a which as shown in FIG. 3 secures or bonds casting 21 within shell 22.

The ends and the bottom of the valve body 12 are then ground flat and the holes 13a and 15a are drilled and holes 15a are tapped.

The bore 28 is then checked with an air-gauge for ovality or any other irregularity. Some of the castings 21 may require honing to finish the bores 28. However, none should require machining.

A very similar procedure is used in the manufacture of the base 11. The interior of the die cast aluminum shell 19 is painted with the same material which forms coating 29 and wax cores, not shown, are supported within shell 19 to form the passages 17. After the resin body 20 has been cast within shell 19 and around the cores, the cores may be removed by heating and the curing of the resin body may be completed. A liner 31a is similarly disposed intermediate the shell 19 and resin body 20.

The ports 11a are then drilled and threaded and it is of importance here to note that the elastomer liner 31a extends fully around each such port between shell 19 and the resin body 20 to provide a seal therebetween.

The soft coatings 29 and 31a applied to shells 22 and 19, respectively, accommodates some of the effects of thermal expansion and contraction of the epoxy resin during curing and as to shell 22 also protects the wax of the core against displacement by such effects. In the completed valve body and base the liners 29a and 31a bond the iner and outer parts of each and as well function as fluid seals where required.

The completed valve is operable under the usual temperature extremes without distortion of the valve body 12 because of the slight flexibility of liner 29a which is sufficient to allow the casting 21 and shell 22 to expand or contract independently of each other.

We claim:

1. In an air valve comprising:
   a. a cast valve body formed of resin mixed with metal powder;
   b. a metal outer shell surrounding said cast valve body; and
   c. a plurality of ports and internal passages communicating with said ports, said ports including inner portions formed in said cast valve body and outer portions formed in said metal outer shell.

the improvement comprising an elastomeric layer disposed between said cast valve body and said metal outer shell and bonding them together, said elastomeric layer being of sufficient thickness to accommodate the differences in thermal expansion and contraction between said cast valve body and said metal outer shell due to their different compositions and extending to the peripheries of said ports between said inner and outer portions thereof, thereby providing an air seal around said ports which prevents leakage of air from one of said ports, between said cast valve body and said metal outer shell, and into another of said ports.

2. An air valve as recited in claim 1 wherein said elastomeric layer is on the order of 0.020 inches in thickness.

3. An air valve as recited in claim 1 wherein at least the outer portions of said ports are threaded to receive the threaded ends of connecting air lines.

4. A valve as claimed in claim 1 wherein said resin is epoxy.

5. A valve as claimed in claim 1 wherein the metal powder is aluminum powder.

6. A valve as claimed in claim 5 wherein the ratio of aluminum to resin is about 67 to 33% by weight and about 22 to 78% by volume.

7. In an air valve, a valve body comprising a cast inner member formed of resin mixed with metal powder and a metal outer shell, said valve body having a number of ports and internal passages communicating with said ports, said ports including inner portions formed in the cast inner member and outer portions formed in the shell, and an elastomeric layer disposed between said cast inner member and said metal outer shell and bonding them together, said elastomeric layer being of sufficient thickness to accommodate the differences in thermal expansion and contraction between the inner member and shell due to their different compositions and extending to the peripheries of the ports between said inner and outer portions, thereby providing an air seal arouond the ports which prevents leakage of air from one port to between the inner member and the shell and into another port.

8. The air valve of claim 7 wherein the elastomeric layer is in the order of 0.020 inches in thickness.

9. The air valve of claim 7 wherein at least the outer portions of the ports are threaded to receive the threaded ends of connecting air lines.

10. The air valve of claim 7 wherein said resin is epoxy.

11. A valve as claimed in claim 7 wherein the metal powder is aluminum powder.

12. A valve as claimed in claim 11 wherein the ratio of aluminum to resin is about 67 to 33% by weight and about 22 to 78% by volume.

* * * * *